PUSH-PUSH TRANSISTOR CIRCUITS

Filed Dec. 23, 1955 2 Sheets-Sheet 1

INVENTORS
JOHN PRESPER ECKERT, JR.
HARRY J. GRAY, JR.
BY
Charles C. English
AGENT

PUSH-PUSH TRANSISTOR CIRCUITS

Filed Dec. 23, 1955 2 Sheets-Sheet 2

INVENTORS
JOHN PRESPER ECKERT, JR
HARRY J. GRAY, JR.
BY
Charles E. English
AGENT United States Patent Office 2,838,690

Patented June 10, 1958

2,838,690

PUSH-PUSH TRANSISTOR CIRCUITS

John Presper Eckert, Jr., Philadelphia, and Harry J. Gray, Jr., Springfield, Pa., assignors to Sperry Rand Corporation, New York, N. Y., a corporation of Delaware Application December 23, 1955, Serial No. 554,989

18 Claims. (Cl. 307—88.5)

The present invention relates to computer circuits, and is more particularly concerned with a computer circuit employing transistors and capable of higher repetition rates, for instance rates of two and a half megacycles per second, than has been the case heretofore. In this respect the present invention is primarily concerned with novel push-push transistor arrangements which are adapted to provide higher frequencies of operation than has been possible in single transistor circuits known heretofore, while at the same time permitting sufficient time for the transistors to turn "on" in order to obtain high power gains.

Various transistor circuits are employed at the present time in logical elements such as those utilized in computation devices; and these circuits, while for the most part efficient, have been subject to the limitation that a practical upper limit in permissible repetition rate is present due to the finite time necessary for the turning "on" and "off" of transistors employed. The present invention contemplates improved transistor circuits adapted for higher frequencies of operation than has been possible in the past; and these circuits permit this improved operation through the provision of a plurality of substantially parallel transistor channels disposed between a common input point and a common output point in combination with means selectively rendering different ones of said channels conductive during different time periods, whereby the pulses in a train of input signals may be selectively amplified in different ones of said channels at times when others of the channels are inoperative or are being turned "on" and "off."

In providing for this improved structure, preferred embodiments of the present invention employ a pair of channels in combination with differently phased pulse sources coupled respectively to those channels; but it will be appreciated from the following description that more than two channels may in fact be provided, thereby to increase even further the permissible repetition rates of operation.

It is accordingly an object of the present invention to provide an improved transistor circuit.

A further object of the present invention resides in the provision of novel push-push circuits.

A still further object of the present invention resides in the provision of improved circuits adapted to permit multi-layer logic to be performed at high repetition rates with a large number of possible drives.

Still another object of the present invention resides in the provision of improved push-push transistor circuits employing clean-up and/or regeneration, thereby to improve the operating characteristics of the circuits.

Still another object of the present invention resides in the provision of transistor circuits effectively utilizing minority carrier storage in effecting improved operation.

A still further object of the present invention resides in the provision of improved transistor circuits adapted for operation at higher permissible repetition rates than has been the case in the past.

A still further object of the present invention resides in the provision of circuits adapted to employ various forms of transistors including field-effect transistors, and capable of utilization in high speed computation structures.

A still further object of the present invention resides in the provision of improved push-push transistor circuits having higher power gains and better sensitivity and reliability than has been the case in transistor circuits utilized heretofore.

In providing for the foregoing objects, the present invention contemplates an improved transistor circuit exhibiting a plurality of substantially parallel amplifying channels disposed between a common source of spaced input pulses and a common output point. Each of the said channels is in turn associated with one or more pulse sources, and these sources are adapted to render the channels conductive during predetermined time periods, and to forcibly "turn off" and "clean up" transistors in the said channels during other time periods. The several pulse sources, utilized in combination with the aforementioned several channels, are differently phased with respect to one another whereby successive pulses appearing at the said common input point are regularly switched to and amplified by different ones of the said plural channels during different successive time periods; and by this arrangement, the over-all plural channel circuit may be caused to operate at a substantially higher repetition rate than is the case in respect to any one of the said channels.

In providing for the foregoing operation, the present invention may utilize various types of transistors, such as point contact or junction type transistors; and these transistors may in turn be of the PNP or of the NPN type, and may be connected in various configurations, such as grounded base or grounded emitter circuits. When such transistors are employed, enhancement effects, produced by minority carrier storage, are selectively employed to stretch an output pulse beyond the termination time of an input pulse applied to a given channel thereby to permit varying lengths of input pulses, occurring during a preselected pulse period, to be amplified without interfering with the amplification of other pulses in other channels; and further pulse sources are employed for cleaning up the transistor comprising any given channel during a predetermined time interval at the termination of the preselected pulse period for that given channel. In addition, when such transistor circuits are employed, the pulse sources utilized may be adapted to open a given channel to an input pulse at a given input time; and may further be adapted to key the load to that given channel at a subsequent time, thereby providing a predetermined time interval for the transistor to turn "on," whereby higher power gains in each of said channels are effected. The circuits further lend themselves to the incorporation of regeneration whereby the sensitivity and reliability of the circuits are improved.

In accordance with a modification of the present invention, field-effect transistors may be utilized in the aforementioned plural channels thereby simplifying the input and output networks for the over-all circuit.

The foregoing objects, advantages, construction and operation of the present invention will become more readily apparent from the following description and accompanying drawings, in which.

Figure 1:
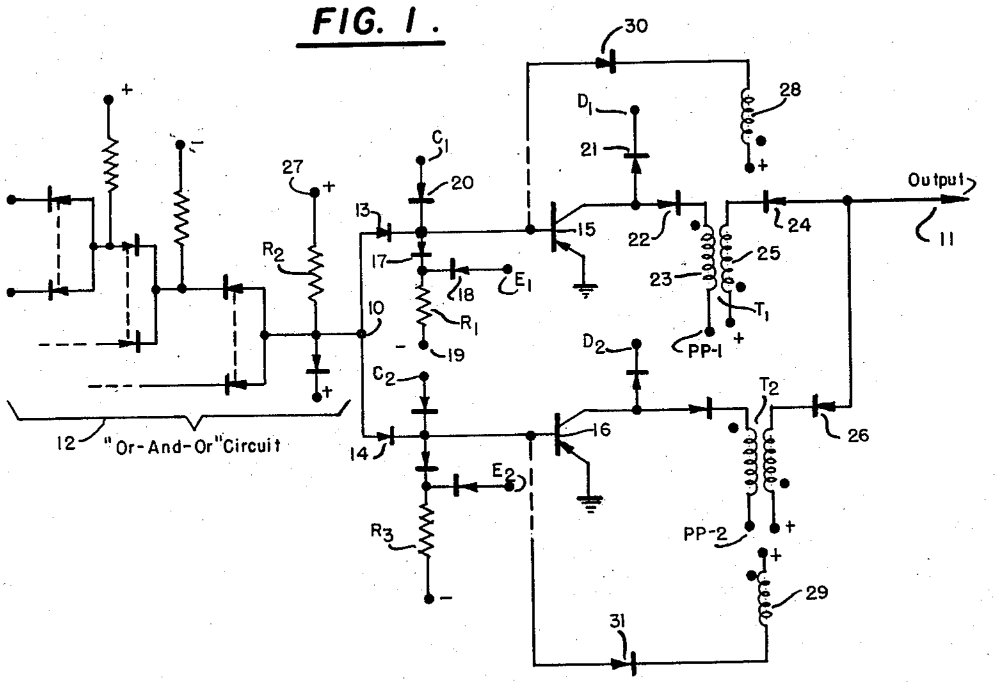
Figure 1 illustrates one form of push-push transistor circuit constructed in accordance with the present invention.

Referring now to Figure 1, it will be seen that, in accordance with the present invention, a push-push transistor circuit may comprise a pair of transistor signal channels disposed between a common input point 10 and a common output point 11. The input to the point 10 may be provided by a multi-layer gating circuit, for instance, such as that designated the "Or-And-Or" circuit 12; and such multi-level gating circuits are well known in the art and may take various configurations whereby more or less diode gating levels are utilized.

Signals appearing at input point 10 are coupled via rectifiers 13 and 14 respectively to the aforementioned pair of signal channels; and these signal channels each include a transistor such as 15 and 16. In the particular example illustrated in Figure 1, the transistors 15 and 16 have been illustrated as PNP type transistors having a grounded emitter connection; but the aforementioned variations in possible forms of transistor, as well as in possible connections thereof, may be effected by appropriate changes in the polarities of the various pulse sources utilized as well as in the polarities of the various reference sources and diodes; and such modifications will be apparent to those killed in the art.

Examining the upper channel, employing transistor 15, it will be seen that pulses appearing via rectifier 13 are coupled to an input circuit comprising rectifiers 17 and 18 and resistor R1. The junction of rectifiers 17 and 18 is connected to the said resistor R1 which is in turn coupled to a negative reference source 19; and the anode of rectifier 18 is in turn coupled to a pulse source $E_1$ having the configuration shown in Figure 2H. As will become apparent from the subsequent description, pulse source $E_1$ in combination with elements 17, 18, 19 and resistor R1, tend to permit the base of transistor 15 to be pulled negative during preselected time intervals whereby the channel employing transistor 15 is adapted to amplify input signals appearing therein during these predetermined time intervals.

The base of transistor 15 is returned to a pulse source C1 (Figure 2D), via a further rectifier 20, and the pulse source C1 provides base clean-up for the transistor 15 during preselected time intervals. The collector of transistor 15 is also coupled via a rectifier 21 to a further pulse source D1 (Figure 2F), which provides collector clean-up in coincidence with the base clean-up provided by source C1; but, as will be apparent to those skilled in the art, the said source D1 need not be a separate pulse source but can in fact comprise the pulse source PP–2 (Figure 2C), to be described. The collector of transistor 15 is also coupled via a further rectifier 22 to one end of winding 23, comprising the primary of a transformer T1; and the lower end of winding 23 is returned to a pulse source PP–1 (Figure 2B) which serves to key a load connected to output point 11, and via rectifier 24, to the secondary winding 25 of transformer T1, during preselected time intervals.

The arrangement thus described is adapted to amplify pulse signals appearing at input point 10 during predetermined time intervals; and pulse signals appearing at the said terminal 10 may be amplified during still other time intervals by the lower channel employing transistor 16, in a manner analogous to that which will be described in reference to the upper channel employing transistor 15. For purposes of clarity, the majority of the several components comprising the lower channel, having transistor 16, have not been given number designations, but it will be readily seen by comparison that this lower channel is of the same configuration as the upper channel employing transistor 15 and operates in a like manner to the upper channel, except that the various pulse sources controlling the said upper and lower channels are phase displaced with respect to one another, thereby to cause the different channels to be operative during different time periods.

Figure 2:
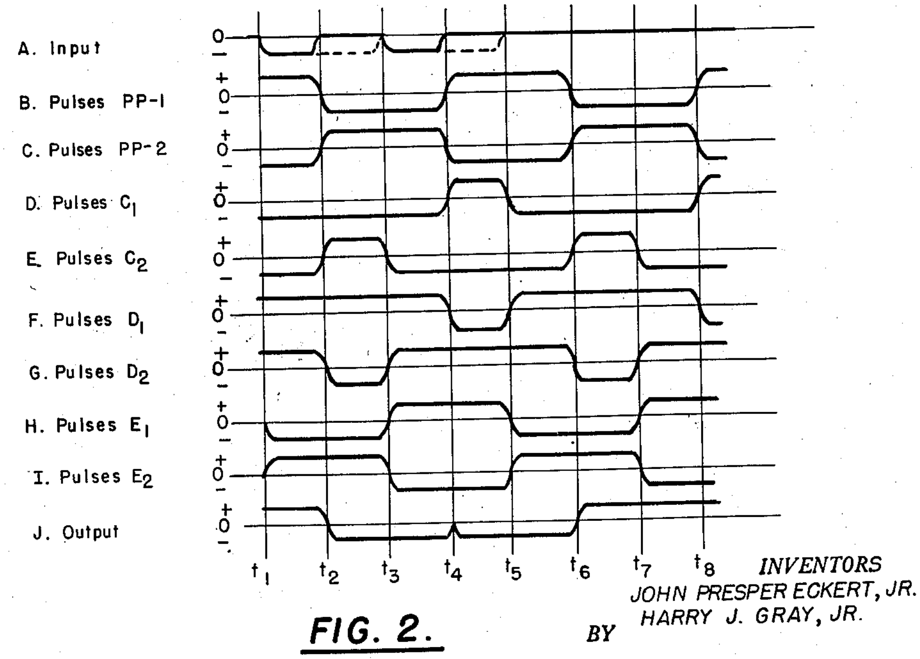
Figure 2 (A through J) are waveforms illustrating the operation of the circuit shown in Figure 1.

The operation of the circuit shown in Figure 1 will become readily apparent from an examination of the waveforms shown in Figure 2. One pulse period may be considered to comprise the time interval *t1* to *t3*, for instance, and this pulse period *t1* to *t3* may in fact be 0.4 μs. for purposes of illustration, this figure being selected as illustrative 2½ mc. operation in the over-all circuit. Input pulses (Figure 2A) can have any width, with the illustrated timing, between one-half and one pulse period, and this permissible variation in input pulse width has been shown by the dotted representation in Figure 2A.

It will be appreciated from the following discussion that the initial one-half of the pulse period, for instance the time interval *t1* to *t2*, permits a given transistor to be charged in response to application of an input signal, and that the load is keyed into an operative channel at the termination of this initial one-half pulse period. Thus, the permissible variation in input pulse width arises by reason of the fact that once the transistor in a given channel is charged, an output therefrom will be sustained by enhancement or minority carrier storage, until the transistor is turned "off" and cleaned up by other pulse sources coupled to the said given channel.

The power pulse sources PP–1 and PP–2 (Figures 2B and 2C), are illustrated as having a 50—50 duty cycle; and these power pulses may be employed as collector clean-up pulses; or in the alternative, such clean-up may be provided by pulse sources D1 and D2 (Figures 2F and 2G), in conjunction with base clean-up pulses C1 and C2 (Figures 2D and 2E). It must be emphasized that the various duty cycles shown in Figure 2 for the several pulse sources are illustrative only and that other duty cycles may be employed.

Referring now to the operation of the over-all circuit, it will be seen that a negative-going input pulse may appear at terminal 10 during a time interval *t1* to *t2* (or during a time interval commencing during *t1* to *t2* and extending beyond *t2*). During this time interval *t1* to *t2*, pulse source $E_1$ is negative in potential, whereby rectifier 18 is disconnected; and the negative potential source 19, in combination with resistor R1 and rectifier 17, serves to pull the base of transistor 15 negative. During this same time interval *t1* to *t2*, the pulse source E2 is positive whereby the base of transistor 16 cannot be pulled negative and for all practical purposes the lower channel utilizing transistor 16 is out of the circuit. Thus, during this initial time period *t1* to *t3* (corresponding to the negative-going excursion of pulse source $E_1$ and to the positive-going excursion of pulse source E2), only the upper channel employing transistor 15 is operative.

By analogy, it will be seen that during a next successive pulse period, for instance *t3* to *t5*, the polarity of pulses $E_1$ and E2 reverses whereby the lower channel employing transistor 16 is operative and the upper channel employing transistor 15 is out of the circuit; and the operation to be described with reference to the upper transistor channel therefore applies with equal force to the lower transistor channel during a later time interval.

Thus, inasmuch as only the upper channel employing transistor 15 is operative during the time interval *t1* to *t3*, an input pulse (Figure 2A) appearing at terminal 10 during this first time period, is switched to the said upper channel. During the initial time period *t1* to *t2*, pulse source PP–1 (Figure 2B) is positive in polarity thereby disconnecting rectifier 22 and disconnecting a load coupled to terminal 11 from the said upper channel, so that the input pulse portion which occurs during the time interval *t1* to *t2* acts to charge transistor 15.

At time *t2*, the pulse source PP–1 falls to a negative potential thereby connecting rectifier 22; and the transistor 15 thereupon passes collector current via winding 23 whereby potentials induced in winding 25 are coupled via rectifier 24 to the output point 11. Since the pulse source PP–1 remains negative during the time interval *t2* to *t4* (Figure 2B), the output appearing at terminal 11 via the upper channel employing transistor 15, similarly appears during this time interval *t2* to *t14* (Figure 2J); and in this respect minority carriers previously charged in the transistor 15 are employed to stretch this output beyond the termination of the input signal. At time *t4*, source PP–1 goes positive, again disconnecting rectifier 22 thereby to eliminate an output at terminal 11.

Prior to time *t4*, the pulse source C1 (Figure 2D) is negative in polarity thereby disconnecting rectifier 20, while the pulse source D1 (Figure 2F) is positive in polarity thereby disconnecting rectifier 21. At time *t4*, however, pulse source C1 rises to a positive potential while pulse source D1 falls to a negative potential thereby rendering both rectifier 20 and rectifier 21 conductive whereby base and emitter clean-up of transistor 15 simultaneously occurs. This clean-up is provided for transistor 15 during the time interval *t4* to *t5*, for instance, and because of the clean-up, as well as because of source PP–1 disconnecting rectifier 22, the output from the upper channel at point 11 is rapidly eliminated at time *t4*.

A further input pulse appearing during the time interval *t3* to *t4* (Figure 2A), or stretched beyond *t4*, as described previously, is switched to the lower channel (employing transistor 16) via rectifier 14 since, subsequent to time *t3*, pulse source $E_1$ is positive thereby disconnecting the input from transistor 15, while pulse source E2 is negative thereby connecting the input 10 to transistor 16. Thus, this next subsequent input pulse appearing during the time interval *t3* to *t4* is switched to the lower channel employing transistor 16, is amplified by that lower channel in the manner already described, and provides an output via rectifier D26, commencing at the time interval *t4* and extending to time interval *t6* in a manner analogous to that already described in reference to the upper channel employing transistor 15. Since the rectifiers 24 and 26 are buffed to the common output point 11, these successive outputs from the different transistor channels appear successively at the common output point 11.

It should be noted that a transistor in a given channel is in a low impedance state during the time interval that an input pulse may be coupled to the other channel; and the pulse sources $E_1$ and E2, in combination with the other components described, assure that successive pulses are switched to their appropriate amplification channels, notwithstanding the impedance state of a transistor in some other channel. It should further be noted that since pulse sources $E_1$ and E2 are never simultaneously negative, the resistor R2, comprising a portion of the input gating circuit 12, in combination with the positive potential source 27, may be so selected that it holds up only one and not both of the resistors R1 and R3 in the absence of an input signal; and this latter feature of the circuit approximately doubles the power gain of the over-all arrangement. As mentioned previously, NPN type transistors may be substituted for the PNP type transistors illustrated, by changing the pulse and voltage polarities and by reversing the several rectifiers.

In order to further increase the power gain of the over-all arrangement, regeneration may be employed; and this possibility of regeneration may be readily practiced by modification of the circuit already described. Thus, tertiary windings 28 and 29 may be coupled respectively to the transformers T1 and T2 in the upper and lower transistor channels respectively; and potentials induced in these tertiary windings 28 and 29 may be coupled via further rectifiers 30 and 31 respectively to the bases of transistors 15 and 16. Further arrangements will be suggested to those skilled in the art.

In accordance with a modification of the invention, circuits of the type shown in Figure 1, employing a pair of transistor channels switched to operate on alternate pulses of an input pulse train, may be effected with field-effect transistors, and such field-effect transistors may be substituted for the transistors shown in Figure 1. When field-effect transistors are employed, moreover, some simplification of the push-push circuit may be effected. Such transistors are shown in the simplified circuit of Figure 3 as elements 35 and 36, and the symbols employed are representative of unipolar field-effect transistors, wherein D stands for "drain," S stands for "source" and G stands for "gate."

In PN field-effect transistors, of the type illustrated, the solid state material comprises an n-type semiconductor. Conduction in such transistors is thought to take place from source to drain, solely by means of majority carriers; and such conduction is not a diffusion process. More positive values of bias on the gates G, with respect to the sources S, increase the effective cross-section of the semiconductor between the source and drain, thus increasing the current flow; while more negative gate biases decrease the current flow. At some negative gate voltage, called the "pinch-off" voltage, current flow ceases. The drain voltage-current characteristic of the transistor in fact resembles the plate characteristic of a pentode.

A conducting or non-conducting field-effect transistor of the type shown at 35 and 36 draws very little current in the gate circuit and hence, the gate circuits in plural such transistors, for instance the two transistors 35 and 36, may be connected in parallel without the necessity of using a switching network of the type described in Figure 1 and without the necessity of employing gating pulse sources such as $E_1$ and E2. It should be noted, however, that since there are few, if any, minority carriers involved in the conduction process in field-effect transistors, storage effects do not occur; and some means, such as external regeneration, must be used to sustain the output after the input has subsided. This situation should be compared with the regeneration provisions of Figure 1, inasmuch as these former regeneration provisions were optional in nature; while, when field-effect transistors are employed, the regeneration is necessary to sustain the output.

Figure 3:
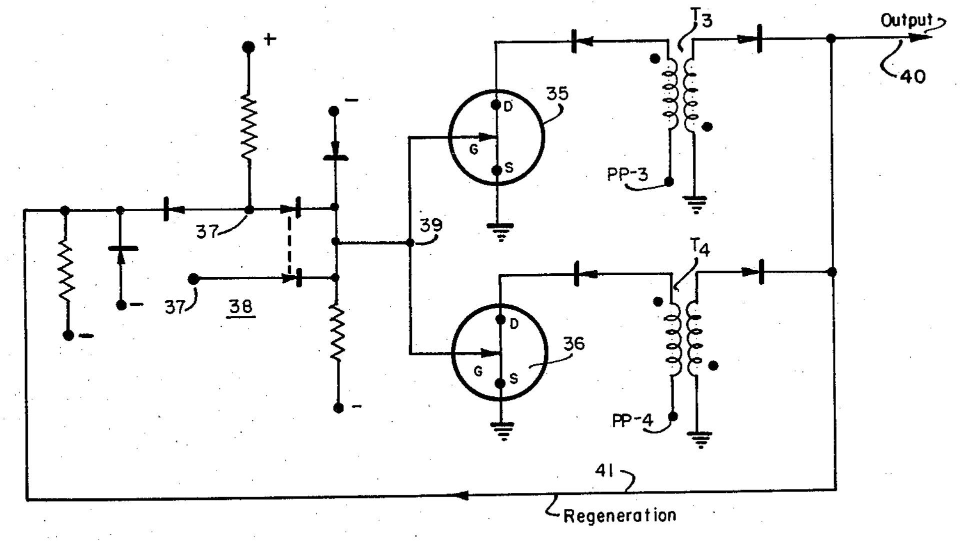
Figure 3 is illustrative of another embodiment of the present invention utilizing field-effect transistors.

Referring with greater particularity to the circuit shown in Figure 3, it will be seen that input pulses may be coupled to terminals 37, for instance, and may be applied via an input gate 38, which may, as before, comprise multi-layer gates. Such input pulses are thereafter coupled to a common input point 39 and are selectively switched to the output point 40 via the upper and lower transistor channels, during alternate time periods. This switching is accomplished under the control of pulse sources PP–3 and PP–4 which are coupled respectively to one winding in each of transformers T3 and T4, associated with the said upper and lower transistor channels; and the pulse sources PP–3 and PP–4 (Figures 4B and 4C), as before, have opposite phases whereby a load coupled to output terminal 40 is energized by pulses from different ones of the said transistor channels during different time periods. It should be noted that the timing of pulses PP–3 and PP–4 may take the configuration shown in full line, or in dotted line, and the dotted line timing does effect some advantage in the push-push circuit shown since increased output may be achieved while still providing adequate time for transformers T3 and T4 to recover. For purposes of clarity, however, the subsequent description is directed toward the full line representation of pulses PP–3 and PP–4, shown in Figure 4.

Figure 4:
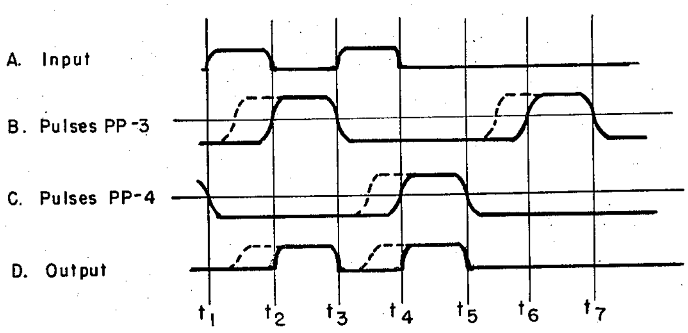
Figure 4 (A through D) are waveforms illustrating the operation of the circuit shown in Figure 3.

Thus, referring to Figure 4, it will be seen that a first input pulse appearing during time interval *t1* to *t2* (Figure 4A) is switched to output point 40, by positive-going power pulse PP–3, via the upper channel utilizing transistor 35, during a time interval *t2* to *t3*, and a portion of the output pulse so appearing at terminal 40 may be coupled via regeneration line 41 back to the input of the circuit, thereby to sustain this output pulse during the time interval *t2* to *t3*. Similarly, a second input pulse appearing during the time interval *t3* to *t4* is switched to output point 40 via the lower channel utilizing transistor 36 during a time interval *t4* to *t5* by the positive-going power pulse PP–4; and this further output pulse is again sustained during the time interval *t4* to *t5* by regenerative feedback to the input of the circuit via regeneration line 41. Thus, it will be noted that the over-all circuit operates essentially in the manner described in reference to the circuit of Figure 1, but that the circuit of Figure 3 is substantially simpler than that described in Figure 1.

While preferred embodiments of the present invention have been described, many variations will be suggested to those skilled in the art; and certain of these variations have already been discussed. Still further modifications may be effected, and it must therefore be stressed that the foregoing description is meant to be illustrative only and should not be considered limitative of our invention. All such modifications as are in accord with the principles described are meant to fall within the scope of the appended claims.

Having thus described our invention, we claim:

1. In a control circuit, a plurality of signal channels, each of said channels including a transistor amplifier, means connecting said plurality of channels in parallel between a common input point and a common output point, said last-named means including a plurality of transformers coupling the outputs of said plurality of transistor amplifiers to said common output point respectively, means coupling spaced pulses to said common input point, and control means coupled to said channels for rendering different ones of said channels operative during different time periods whereby successive ones of said spaced pulses are switched to and amplified by different ones of said channels during different time periods, said control means including means coupling differently phased control pulses to said plurality of transformers thereby to render different ones of said transformers responsive to output signals from said transistor amplifiers during different time intervals.

2. The circuit of claim 1 wherein said control means also includes a switching circuit in each of said channels, said switching circuits being coupled to the inputs of the transistor amplifiers in said channels, and a source of further control pulses coupled to said switching circuit in each of said channels, the said further control pulses coupled to different ones of said channels being of different phases respectively, the said further control pulses coupled to the switching circuit in a given channel being phase displaced from the first-mentioned control pulses coupled to the transformer in said given channel.

3. The control circuit of claim 1 wherein each of said channels includes a transformer having a first winding coupled to the output of said transistor amplifier and a second winding coupled to the said output point, rectifier means in series with said first winding and the output of said transistor amplifier in each of said channels, and a plurality of sources of differently phased energization pulses coupled to the said rectifier means for rendering different ones of said rectifier means conductive during different time intervals thereby to operatively couple said output point via said transformer to different ones of said channels during different successive time periods.

4. The control circuit of claim 3 including a plurality of sources of clean-up pulses coupled respectively to said transistor amplifiers, the said clean-up sources being differently phased and the clean-up sources in each of said channels being operative subsequent to operation of the said energization pulses in said channel.

5. The circuit of claim 4 wherein each of said transistor amplifiers has clean-up pulses coupled to plural electrodes thereof.

6. The circuit of claim 1 wherein each of said transistor amplifiers comprises a field-effect transistor.

7. In a control circuit, a pair of amplifier channels each of which includes a transistor, each of said channels having an input and an output, means coupling said inputs to a source of spaced signal pulses, output means coupling said outputs to a common output point, and a source of regularly spaced control pulses coupled to each of said channels for rendering said channels alternately operative and inoperative during alternate time periods, whereby said spaced signal pulses are coupled to said common output point via alternate ones of said channels during alternate time periods, and regenerative feedback means coupling output signals from the output means in each of said channels to an input electrode of the transistor in said channel whereby the output of a given channel is sustained subsequent to cessation of an input signal pulse applied thereto and is dependent upon the operation of said control pulses subsequent to occurrence of an input signal pulse.

8. The circuit of claim 7 wherein each of said transistors comprises a field-effect transistor having a gate electrode, and means coupling said gate electrodes in parallel to said source of signal pulses.

9. The circuit of claim 7 including a transformer between the output of each of said channels and said common output point, said source of control pulses being coupled to said transformers to render said transformers selectively responsive to transistor outputs during different time intervals.

10. The circuit of claim 7 wherein said source of spaced control pulses is coupled to a switching circuit in each of said channels, and means coupling the switching circuit in each of said channels to an input electrode of the transistor in said channel, each of said switching circuits including means responsive to said source of control pulses for controlling the potential on said transistor input electrode thereby to render said transistor selectively responsive to signals from said signal pulse source.

11. The circuit of claim 7 wherein said source of spaced control pulses is coupled to a circuit point in each of said channels between said common output point and the transistor in said channel, whereby said common output point is operatively coupled to different ones of said channels during different time periods.

12. In a control circuit, a plurality of transistor amplifying channels connected in parallel between a common input point and a common output point, a source of spaced input signals coupled to said common input point, a first control pulse source for operatively coupling said input signals to different ones of said amplifying channels during different time periods, and a second control pulse source for operatively coupling said common output point to different ones of said channels during different time periods.

13. The circuit of claim 12 including a third control pulse source for cleaning up the transistors in different ones of said channels during different time periods.

14. The circuit of claim 13 wherein each of said first, second and third control pulse sources comprises means coupling regularly occurring control pulses of respectively different phases to different ones of said channels.

15. In a control circuit, a plurality of transistor amplifiers each of which has an input electrode and an output electrode, a source of input signals, means coupling said input source to each of said input electrodes, a plurality of transformers each of which has a primary winding and a secondary winding, rectifier means coupling the output electrode of each of said transistors to one end of the primary winding of each of said transformers respectively, control pulse means coupled to the other end of the primary winding of each of said transformers for selectively rendering each of said rectifier means responsive to output signals at the output electrode of its associated transistor, said control pulse means including means applying differently phased output control pulses to said other ends of different ones of said primary windings respectively, and means coupling said secondary windings to a common output point.

16. The combination of claim 15 including further control pulse means for applying differently phased input control pulses to the input electrodes of said transistors respectively, thereby to render different ones of said transistors receptive to input signals during different time intervals respectively.

17. The combination of claim 16 wherein the input and output control pulses for each of said transistors are differently phased with respect to one another, whereby each of said transistors is receptive to an input signal for a predetermined time interval prior to the time its associated rectifier means is rendered responsive to output signals therefrom.

18. In a control circuit, a plurality of transistor amplifiers each of which has an input electrode and an output electrode, a source of input pulses, an output terminal, first switch means for coupling said input source to different ones of said input electrodes during different regularly spaced first time intervals, and second switch means for coupling said output terminal to different ones of said output electrodes during different regularly spaced second time intervals, said first and second time intervals being in overlapping relation to one another whereby said input source is coupled in succession to the input electrodes of said transistors for a predetermined portion of each first time interval prior to the coupling of said output terminal to the output electrodes of said transistors.

References Cited in the file of this patent

UNITED STATES PATENTS

| | | |
|---|---|---|
| 2,420,374 | Houghton | May 13, 1947 |
| 2,495,739 | Labin et al. | Jan. 31, 1950 |
| 2,586,080 | Pfann | Feb. 19, 1952 |
| 2,712,065 | Elbourn et al. | June 28, 1955 |

FOREIGN PATENTS

| | | |
|---|---|---|
| 129,404 | Australia | Oct. 17, 1948 |